United States Patent [19]

Stone et al.

[11] Patent Number: 5,443,354
[45] Date of Patent: Aug. 22, 1995

[54] HAZARDOUS MATERIALS EMERGENCY RESPONSE MOBILE ROBOT

[75] Inventors: Henry W. Stone, Altadena; James W. Lloyd, Pasadena; George A. Alahuzos, Sierra Madre, all of Calif.

[73] Assignee: The United States of America as represented by the Administrator of the National Aeronautics and Space Administration, Washington, D.C.

[21] Appl. No.: 917,554

[22] Filed: Jul. 20, 1992

[51] Int. Cl.[6] .................................................. B25J 5/00
[52] U.S. Cl. .................................... 414/729; 81/177.6; 414/786; 901/1; 901/9; 901/39; 901/46
[58] Field of Search ............ 414/2, 680, 729, 786; 901/45, 46, 47, 1, 39, 41, 9; 244/135 A; 73/863.12; 246/122 A; 294/907, 64.1, 100; 81/451, 177.6

[56] References Cited

U.S. PATENT DOCUMENTS

| | | | |
|---|---|---|---|
| 2,094,134 | 9/1937 | Obergfell | 246/122 A X |
| 2,858,947 | 11/1958 | Chapman . | |
| 3,241,687 | 3/1966 | Orloff . | |
| 3,788,168 | 1/1974 | Steinmann, Jr. | 81/177.6 |
| 3,880,304 | 4/1975 | Strickland, Jr. | 414/2 X |
| 4,132,318 | 1/1979 | Wang et al. | 414/21 X |
| 4,243,923 | 1/1981 | Whitney et al. | 318/561 |
| 4,290,203 | 9/1981 | Rebman | 33/169 C |
| 4,483,407 | 11/1984 | Iwamoto et al. | 901/1 X |
| 4,488,242 | 12/1984 | Tabata et al. . | |
| 4,500,058 | 2/1985 | Reginato | 246/122 A X |
| 4,615,615 | 10/1986 | Krolak et al. | 901/35 X |
| 4,626,999 | 12/1986 | Bannister | 364/474 |
| 4,641,251 | 2/1987 | Inoue | 901/46 X |
| 4,652,204 | 3/1987 | Arnett | 414/751 |
| 4,676,713 | 6/1987 | Voelpel | 901/1 X |
| 4,791,588 | 12/1988 | Onda et al. | 901/45 X |
| 4,800,802 | 1/1989 | Rebman | 92/61 |
| 4,819,184 | 4/1989 | Jonsson | 901/9 X |
| 4,835,450 | 5/1989 | Suzuki | 901/45 X |
| 4,843,565 | 6/1989 | Rose | 901/1 X |
| 4,855,822 | 8/1989 | Narenda et al. | 901/1 X |
| 4,956,790 | 9/1996 | Tsuchihashi et al. | 901/3 X |
| 4,984,745 | 1/1991 | Akeel et al. | 901/15 X |
| 5,022,812 | 6/1991 | Coughlan et al. | 901/1 X |
| 5,031,304 | 7/1991 | Shepard et al. | 29/700 |
| 5,040,124 | 8/1991 | Okumura et al. | 364/477 |
| 5,046,022 | 9/1991 | Conway et al. | 901/50 X |
| 5,047,700 | 9/1991 | Szakaly | 318/568.1 |
| 5,141,386 | 8/1992 | Barwise | 414/729 |
| 5,142,143 | 8/1992 | Fite et al. | 73/863.12 X |
| 5,181,427 | 1/1993 | Elias et al. | 73/863.12 |

Primary Examiner—Donald W. Underwood
Attorney, Agent, or Firm—John H. Kusmiss; Thomas H. Jones; Guy M. Miller

[57] ABSTRACT

A simple or unsophisticated robot incapable of effecting straight-line motion at the end of its arm inserts a key held in its end effector or hand into a door lock with nearly straight-line motion by gently thrusting its back heels downwardly so that it pivots forwardly on its front toes while holding its arm stationary. The relatively slight arc traveled by the robot's hand is compensated by a compliant tool with which the robot hand grips the door key. A visible beam is projected through the axis of the hand or gripper on the robot arm end at an angle to the general direction in which the robot thrusts the gripper forward. As the robot hand approaches a target surface, a video camera on the robot wrist watches the beam spot on the target surface fall from a height proportional to the distance between the robot hand and the target surface until the beam spot is nearly aligned with the top of the robot hand. Holes in the front face of the hand are connected through internal passages inside the arm to an on-board chemical sensor. Full rotation of the hand or gripper about the robot arm's wrist is made possible by slip rings in the wrist which permit passage of the gases taken in through the nose holes in the front of the hand through the wrist regardless of the rotational orientation of the wrist.

15 Claims, 8 Drawing Sheets

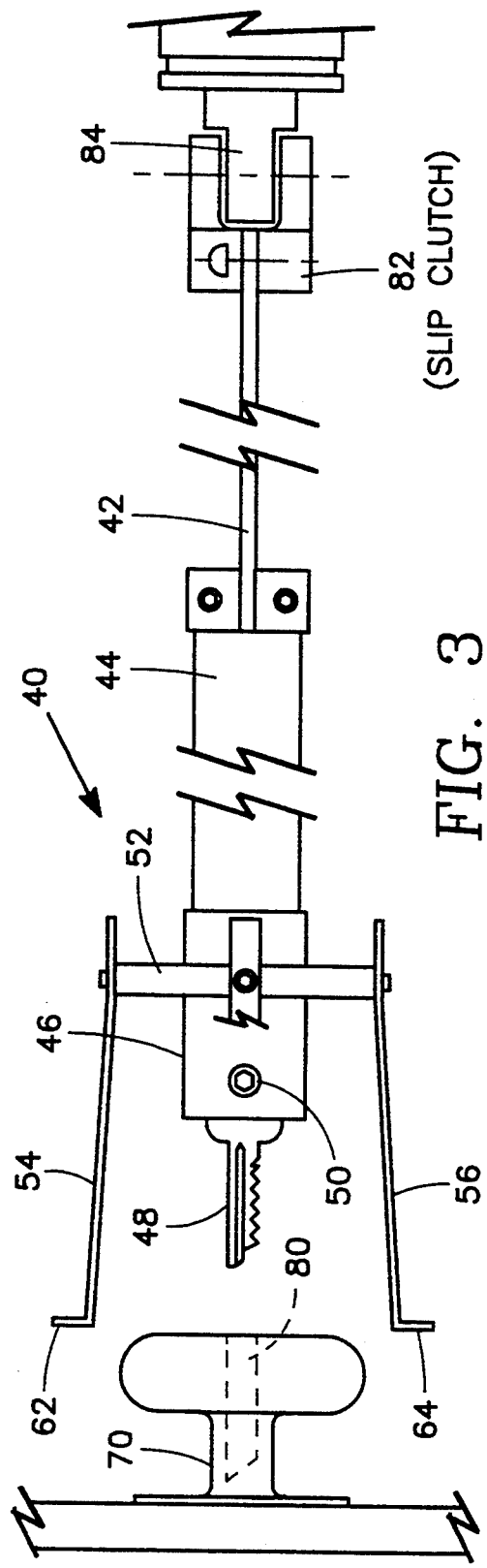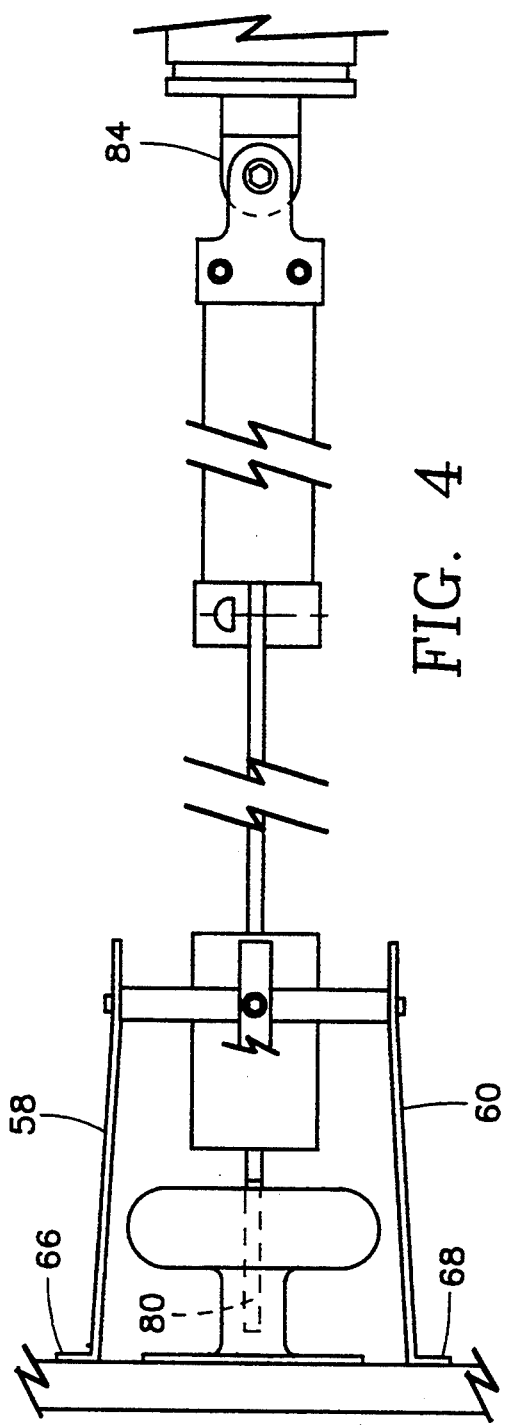

HAZARDOUS MATERIALS EMERGENCY RESPONSE MOBILE ROBOT

BACKGROUND OF THE INVENTION

ORIGIN OF THE INVENTION

The invention described herein was made in the performance of work under a NASA contract, and is subject to the provisions of Public Law 96-517 (35 USC 202) in which the Contractor has elected not to retain title.

1. Technical Field

The invention relates to mobile robots for responding to hazardous materials emergencies where humans cannot go, and particularly to a light weight and economical robot of this type having little or no on-board robot computing ability.

2. Background Art

Hazardous materials emergencies require the penetration of buildings or other structures, which presents several problems. First, before deciding whether to open a door in such a structure, it is desireable to ascertain the nature of the environment behind the door. Secondly, opening the door may require the use of a key and/or the operation of a door latch and holding the door open against a self-closing mechanism. Use of a robot in penetrating such structures would avoid the risks in having humans do so. Such a robot would have to be self-powered, self-contained and small enough to fit into most passageways. However, a robot which can perform the perfectly linear motion required to insert a key into a door lock must have a powerful robot computing system consisting of either (a) a large box housing off-the-shelf integrated circuits on circuit boards or (b) a small but expensive box containing custom integrated circuits. Thus, it would appear that either the robot's compactness is compromised or else the cost of the robot is significantly increased. Also, a remote operator controlling the robot's movement of the key via a two-dimensional video monitor would be hampered because almost all humans are accustomed to inserting keys into door locks with a perspective view of the key and lock (as opposed to a straight-on or frontal view afforded by an arm-mounted or torso-mounted camera on the robot).

A related problem in ascertaining the nature of the environment behind a door to be opened is that a sensor (such as a chemical sensor) held at the end of the robot's arm must be positioned by the robot next to the space between the door and the door jamb. An operator viewing a video monitor while attempting to manually control the robot to perform such a task would be unable to gauge the robot arm's distance and speed relative to the door jamb, without the of a proximity sensor. Unfortunately, a proximity sensor must be interfaced to additional processing electronics and, in some cases, to the robot's on-board computer in order to acquire, transmit and display the speed or distance measurement to the operator. Hence, the electronic integration of a conventional proximity sensor has a significant impact upon various other components of the overall system.

Another problem in ascertaining the nature of the environment behind a door to be opened is that it is not desirable to hold the sensor (e.g., the chemical sensor) at the end of the robot arm, since it might be broken by accidental impact with the door or door jamb due to the operator's inability to judge the speed or range of the arm relative to the door jamb. Thus, the arm might hold in its hand or gripper the open end of a flexible hose line whose other end is connected to the input of the chemical sensor mounted at a safer location on the robot. The problem is that as the gripper rotates with the arm to perform other tasks, the hose will eventually twist too far and either jam the arm or break.

Operating a robot is difficult for the uninitiated, because the operator manually controls joint motion in such robots and must therefore mentally predict the joint motion required to effect the desired hand or gripper motion. Moreover, the operator must know which control knob (or "joystick") controls a particular one of the several joints of the robot. Depending upon the immediate robot arm configuration and the desired hand motion, there can be an inverse relationship between the direction of joint motion and the direction of the hand motion, slowing or preventing appropriate operator action. Thus, the concept of an economical and unsophisticated hazardous materials emergency response robot of the type which every municipality could afford as standard fire station equipment and which could be readily and reliably operated in an emergency with a modicum of prior training has not seemed practical in view of the foregoing.

Various techniques related to the foregoing are known in the art. For example, a remote control robot for hazardous environments is disclosed in U.S. Pat. No. 4,652,204, but is not truly a self-contained mobile robot. U.S. Pat. No. 5,031,304 discloses compliant tools for use by a robot. U.S. Pat. Nos. 4,800,802 and 4,290,203 disclose various compliant tools for general use. U.S. Pat. Nos. 4,819,184 and 4,676,713 disclose, respectively, joysticks and rocker switch panels for robots. U.S. Pat. Nos. 4,615,615 and 4,843,565 disclose laser range finders.

SUMMARY OF THE INVENTION

The foregoing problems are overcome in the hazardous materials emergency response robot of the present invention. A simple or unsophisticated robot incapable of effecting straight-line motion at the end of its arm inserts a key held in its end effector or hand into a door lock with nearly straight-line motion by gently thrusting its back heels downwardly so that it pivots forwardly on its front toes while holding its arm stationary. The relatively slight arc (determined by the height of the robot's hand above the robot's front toes) traveled by the robot's hand is compensated by a compliant tool with which the robot hand grips the door key. As the front part of the key is inserted into the door lock, the interaction of the key and the lock produces a force on the compliant tool, causing the tool to bend slightly in accordance with the slightly arcuate motion of the robot hand, thus permitting the key to continue being inserted into the lock in a straight line without jamming inside the lock.

Once unlocked, the robot pulls the door open by pulling on the compliant tool while the key is still engaged in the door lock. In order to accomodate the rotation of the door as it is being pulled open by the robot backing up, the compliant tool holding the key is connected to the robot hand gripper through a rotating joint which rotates in a horizontal plane about a vertical axis, corresponding roughly to the axis of rotation of the door. The compliant tool and key rotate about the vertical axis up to nearly a right angle with respect to the robot hand, depending upon how far the door is rotated by the pulling motion of the robot.

The operator is apprised of the range and speed of the robot's hand relative to the door lock (or any target object) in an instinctive manner that any untrained operator can immediately grasp and respond to. Specifically, a visible beam from an inexpensive source (such as a laser) is projected through the axis of the hand or gripper on the robot arm end at an angle to the general direction in which the robot thrusts the gripper forward. As the robot hand approaches a target surface (such as the exterior surface of a door), a video camera on the robot wrist watches the beam spot on the target surface fall from a height proportional to the distance between the robot hand and the target surface until the beam spot is nearly aligned with the top of the robot hand (at which point the robot hand is touching the target surface). While the height of the beam spot indicates distance-to-go, the rate at which the spot falls in the field of view indicates the speed of the hand relative to the target surface. If the surface is non-perpendicular to the general direction of forward motion of the robot hand, then a conical beam may be employed, which will be observed as an ellipse on an target surface whose eccentricity indicates the angle of the surface.

In order to provide the operator a perspective view of the robot's hand, a side camera is movably mounted on a horizontal cantilevered side arm extending away from the robot arm in a direction generally transverse to the robot arm. In order to avoid collisions between the side camera and the robot arm or hand, the cantilevered side arm supporting the side camera is mounted on the robot arm above the arm's horizontally pivoting joint, so that all horizontal motions of the arm move the side camera. The operator therefore views the robot action on two video monitors, one for the camera mounted on the robot arm or hand and the other for the side camera.

In order to open latched doors (i.e., doors which require depression of a thumb latch while pulling on a door handle), the robot includes a remotely controlled winch mechanism for deploying and retrieving a specially designed hook attached to the end of a fine cable. To open such a door, the robot arm grasps the hook located in the front of the vehicle and hooks it on the door handle. During this operation, a moderate amount of tension is maintained on the cable by a spring loaded mechanism within the winch. This tension insures that the hook will remain on the door handle once the robot arm lets go of the hook.

After releasing the hook, the robot arm depresses the door latch. The winch mechanism is then switched to its locked position which prevents the cable from being pulled out any further. Then the robot is driven backwards several inches, causing the cable to pull the door open while the robot arm is simultaneously depressing the door's thumb latch. At this point the door is slightly opened, and the robot arm can release the door latch (by moving away from the door). Then, either the robot can back up further or the winch can be activated to reel in the cable, so as to open the door to a nearly completely open position. At this point the robot arm reaches around to the back of the vehicle and grasps a weighted bag (a dead weight) which is carried by the robot. By placing the weighted bag near the inside bottom of the door and by then rotating the robot arm side ways, pushing on the door, the door can be opened completely. When the robot arm and weighted bag make contact with the inside of the door, the winch is switched from its locked position so that the cable will be passively paid out when the robot arm pushes on the door. The robot arm ungrasps the weighted bag which then falls to the ground and secures the door in its fully open position. The robot arm is then used to grasp the cable just behind the hook to release the tension on the portion of the cable between the grasp point on the cable and hook. This causes the hook to automatically fall off of the door handle due to its weight distribution and its shape. Finally, the robot arm can ungrasp the hook which will automatically be retrieved since the winch mechanism is still in its spring loaded mode of operation.

Prior to opening or unlocking a door, in the context of responding to a chemical hazard, it is desirable to have the robot first sense for hazardous gases which may be escaping through the door jamb. For this purpose, the invention includes a sniffer (nose) built into the robot's gripper/arm. Preferably, holes in the front face of the hand are connected through internal passages inside the arm to an on-board chemical sensor. Full rotation of the hand or gripper about the robot arm's wrist is made possible by slip rings in the wrist which permit passage of the gases taken in through the nose holes in the front of the hand through the wrist regardless of the rotational orientation of the wrist.

In conjunction with the foregoing feature, the operator uses the spot projected by the laser beam which is displayed to him/her on the control station's video screen to monitor and rapidly deduce the range and rate of change in the range of the robot's finger tips from the door jamb. The range and rate of change in the range are easily inferred by observing in the video screen the position (i.e., height) and motion of the projected laser beam spot with respect to the image of the robot's fingers. This greatly simplifies the task of placing the robot's finger tips, and hence the chemical sensor's nose, at the door jamb where the robot will "smell" for the presence of dangerous chemicals behind the door.

In order to enable a relatively untrained operator to readily control the robot in response to viewing a video display of the motion of the robot, all of the controls (e.g., joysticks) controlling the various joints of the robot are mounted over a two-dimensional background graphical projection or representation of the robot clearly illustrating its links and joints. Each control or joystick or knob controlling a joint is mounted on the corresponding joint in the two-dimensional representation of the robot.

BRIEF DESCRIPTION OF THE DRAWINGS

FIG. 3 is a side view of a compliant key holder embodying one aspect of the invention.

FIG. 4 is a top view of the compliant key holder of FIG. 3 rotated through a right angle about the axis of the key.

DETAILED DESCRIPTION OF THE INVENTION

Figure 1:
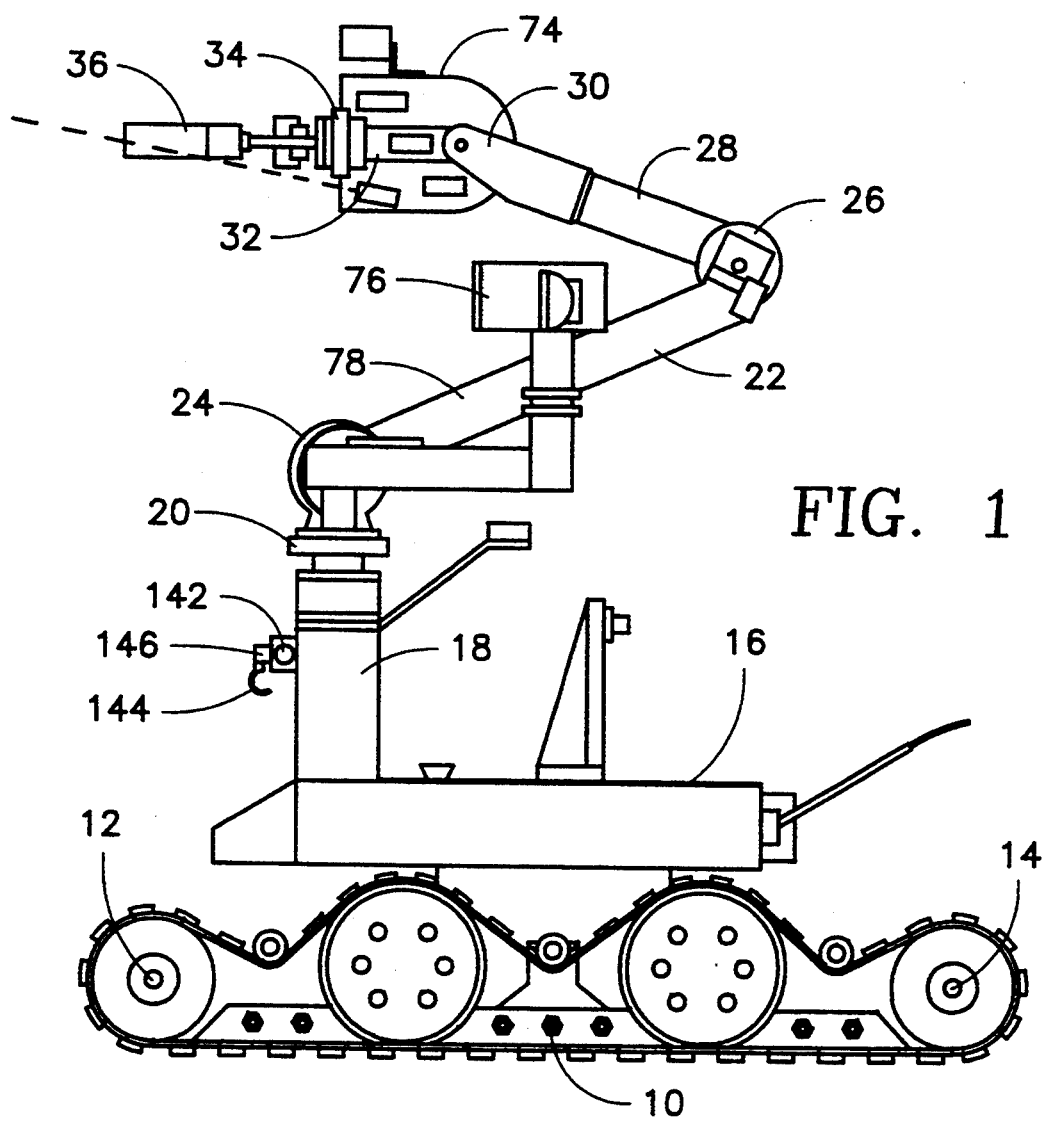
FIG. 1 is a side view of a robot embodying the invention.
Figure 2:
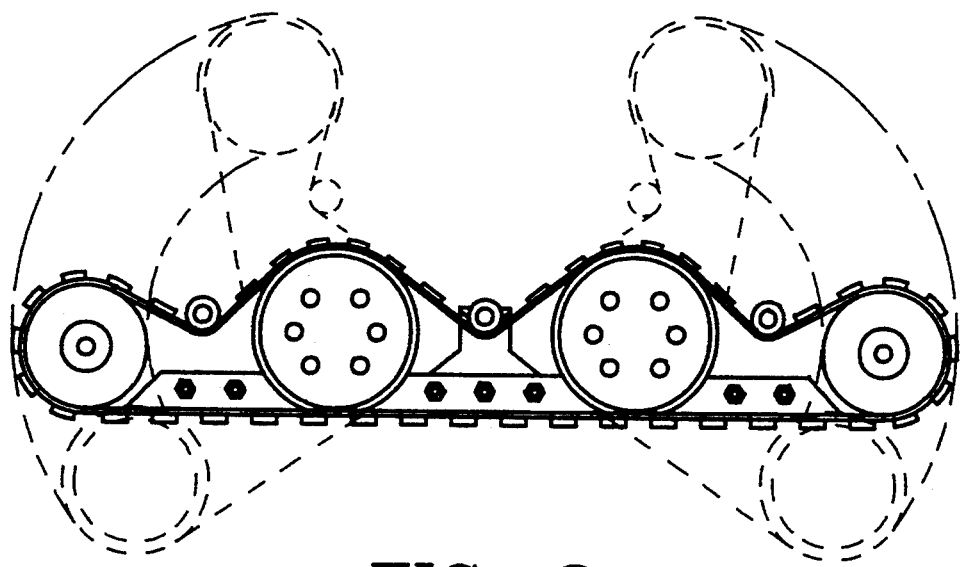
FIG. 2 is a side view of the movable tracks of the robot.

Referring to FIG. 1, a robot embodying the invention includes a main track drive 10, a front articulated track drive 12 and a rear articulated track drive 14. Both articulated track drives may articulate so as to raise or lower themselves above or below the height of the main track drive as shown in FIG. 2. The main track drive 10 supports a chassis 16 from which a standoff 18 extends upwardly. A torso joint 20 attached to the top of the standoff 18 rotates in a horizontal plane while a vertical shoulder joint 24 rotates in a vertical plane. A shoulder link 22 is connected to the shoulder joint 24 and moves with rotation of either of the joints 20 or 24. An elbow joint 26 connected to the distal end of the shoulder link 22 supports rotation of a forearm link 28 in a vertical plane, while a vertical wrist joint 30 connected to the distal end of the forearm link 28 supports rotation of a wrist 32 in a vertical plane. A wrist roll joint 34 connected to the wrist 32 supports rotation of a parallel gripper jaw 36 in a vertical plane orthogonal to that of the vertical wrist joint 30.

Opening a locked door with a key is performed with the compliant key holding tool 40 of FIGS. 3 and 4 held in the parallel gripper jaw 36 as shown. The tool 40 is compliant in two axes by deformation of two orthogonal leafs 42, 44. At the distal end of the far leaf 44, a cylindrical key housing 46 holds a key 48 with a set screw 50. A circular flange 52 supports four deformable tangs 54, 56, 58, 60 whose distal ends 62, 64, 66, 68 fan out radially with respect to the axis of the key housing 46 so as to register the axis of the cylindrical key housing with the center of door knob 70 as the key 48 is thrust toward the door knob 70 by the robot.

Figure 5:
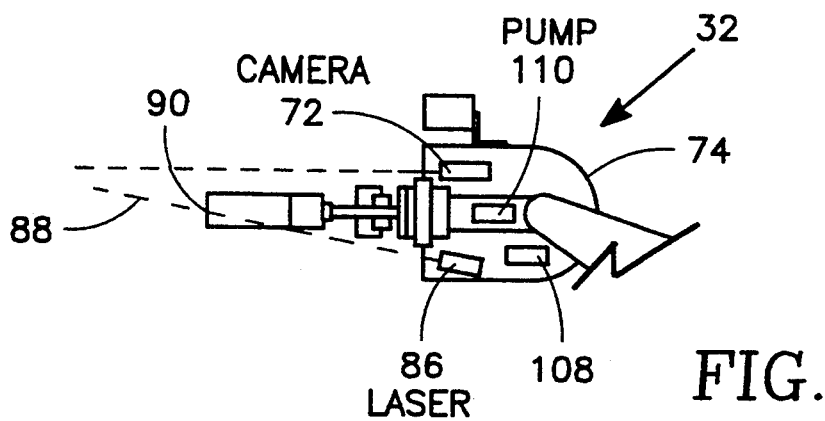
FIG. 5 is a side view of the end effector of the robot of FIG. 1.

An operator manually controls motion of all of the robot joints 20, 24, 26, 30 and 34 while viewing the operation via a camera 72 mounted on the wrist 32 inside a camera housing 74 (as shown in FIG. 5) and via a side camera 76 mounted on a cantilevered side boom 78 supported by and rotating with the torso joint 20 (as shown in FIG. 1). By being forced to rotate with the torso joint 20, the side camera 76 is safe from collision with the gripper 36 or any of the intervening robot links. The side camera 76 provides excellent and remotely controllable side viewing of delicate operations such as that of inserting the key 48 into a keyhole 80 in the door knob 70. The ability to control and optimize the viewing angle in such tasks is critical to performance of the system and also makes it much easier to use.

Figure 6:
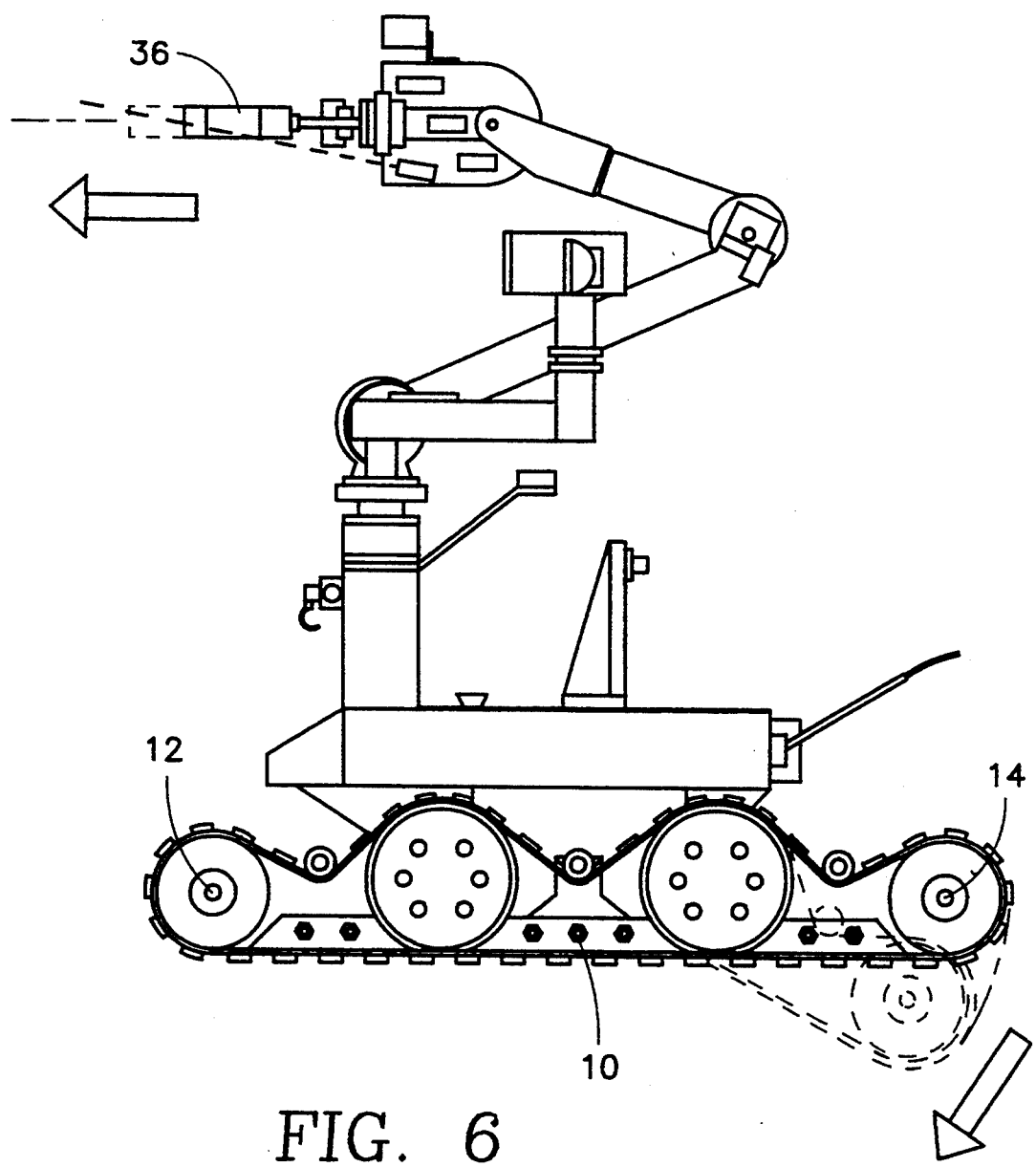
FIG. 6 is a side view corresponding to FIG. 1 illustrating how the robot is tilted forward on its front toes to insert a key in accordance with another aspect of the invention.

In order to insert the key 48 into the key hole 80, the motion of the key 48 must be at least nearly perfectly linear to avoid jamming it in the key hole 80. For this purpose, the operator causes the robot to maneuver until the axis of the key 48 and the axis of the key hole 80 are aligned and the key 48 touches the outside of the key hole 80. Alignment of the key 48 with the key hole 80 requires rotation of the gripper jaw 36 by the wrist roll joint 34. Then, as shown in FIG. 6, the operator causes the rear articulated track 14 to gradually thrust downwardly below the height of the main track 10, which causes the robot to rock forward on its "toes" (i.e., to rock forward over the front articulated track 12), thus creating a nearly linear forward motion of the key 48 into the key hole 80. The slight arcuate shape of the path of the gripper jaw 36 holding the key 48 is compensated by a slight deformation of the leafs 42, 44 of the compliant tool 40 in response to a slight force exerted on the key 48 by interior surfaces (e.g., lock tumblers) within the key hole 80.

The door is unlocked by rotating the gripper jaw 36 and key 48 by the wrist roll joint 34 in the appropriate angular direction. A conventional slip clutch 82 coupling the proximal leaf 42 with the gripper jaw 36 permits the gripper jaw 36 to rotate beyond the rotational position at which the key 48 reaches its limit of rotation within the key hole 80. Typically, then, the operator may command the wrist roll joint 34 to rotate through 180 degrees, for example. Once the door is unlocked, it is opened by moving the robot backwards away from the door while the key 48 continues to be engaged in the key hole 80. This causes the compliant tool 40 to compensate for the resulting rotation of the door and key 46, first by bending the leaf 42 and the leaf 44 and finally by rotating the distal portion of the compliant tool 40 about a passive vertical joint 84 of the tool 40. The passive vertical joint 84 is preferably of the conventional type which rotates upon the application of a predetermined threshold rotational force. The bending of the key tool's compliant members provides the operator with visual cues as to the progress of the operation, since the bending can be directly viewed by the operator via the wrist mounted camera 72.

Figure 7:
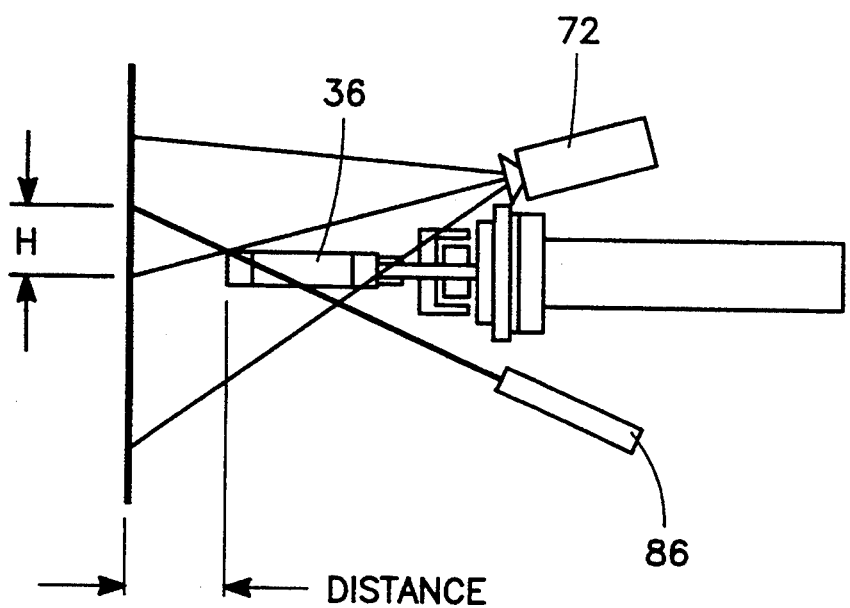
FIG. 7 is a schematic diagram of a camera and beam source for creating a display of range and rate.
Figure 8:
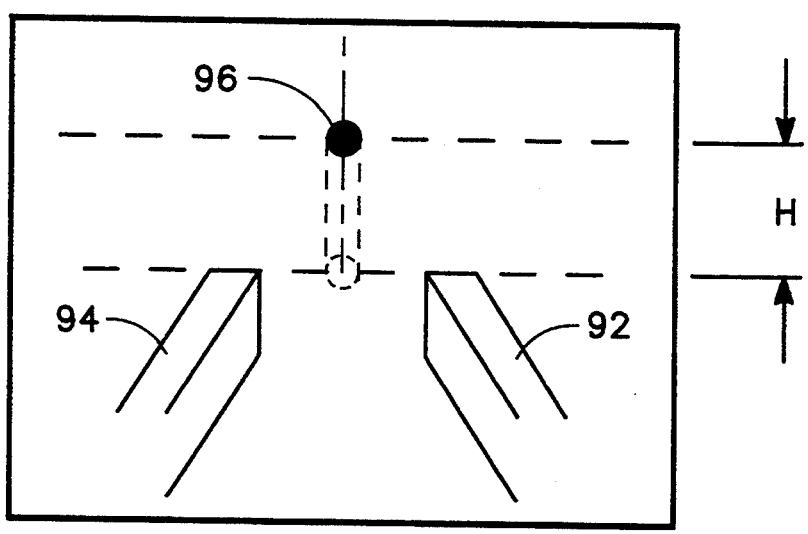
FIG. 8 is a pictoral diagram of a display of range and rate from the camera of FIG. 7.

As illustrated in FIG. 7, a laser beam source 86 projects a laser beam 88 at an acute angle with respect to the line of sight between the camera 72 and the end 90 of the gripper jaw 36. The video display of FIG. 8 generated by the camera 72 shows the right and left fingers 92, 94 of the gripper jaw 36 and a spot 96 illuminated by the laser beam 88 on the door to a remote operator. The height H of the spot 96 relative to the tips of the fingers 92, 94 is an analog display of the distance-to-go while the rate of downward vertical travel of the spot 96 in the video display is an analog indication of the speed of the finger tips relative to the door surface, which the operator can readily understand and respond to.

Figure 9:
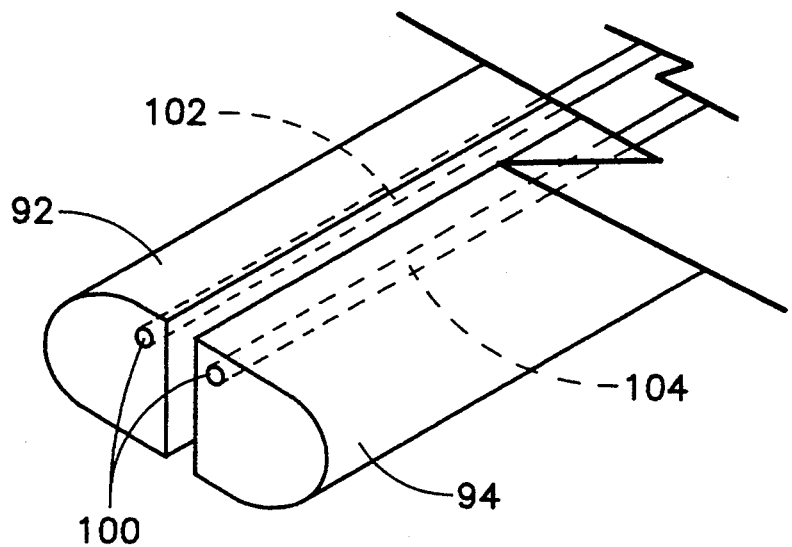
FIG. 9 is a perspective view of environmental sensing features in parallel gripper jaws of the robot of FIG. 1 in accordance with yet another aspect of the invention.

Prior to deciding whether or not to open the door, the operator determines the nature of the environment behind the door by positioning the tips of the fingers 92, 94 against the top of the crack between the door and the door jamb, and "sniffs" any gases escaping therefrom via nose holes 100 (FIG. 9) in the front faces of the tips of each of the fingers 92, 94. Interior sealed passageways 102, 104 conduct the gases received through the holes 100 back through the interiors of the fingers 92, 94 and through a conventional slip ring sealed rotary joint 106 of the wrist roll joint 34, and thence to a sensor 108 (e.g., a chemical or nuclear sensor) within the housing 74 (FIG. 5). An air pump 110 creates a pressure gradient which draws air in through the nose holes 100.

Figure 10:
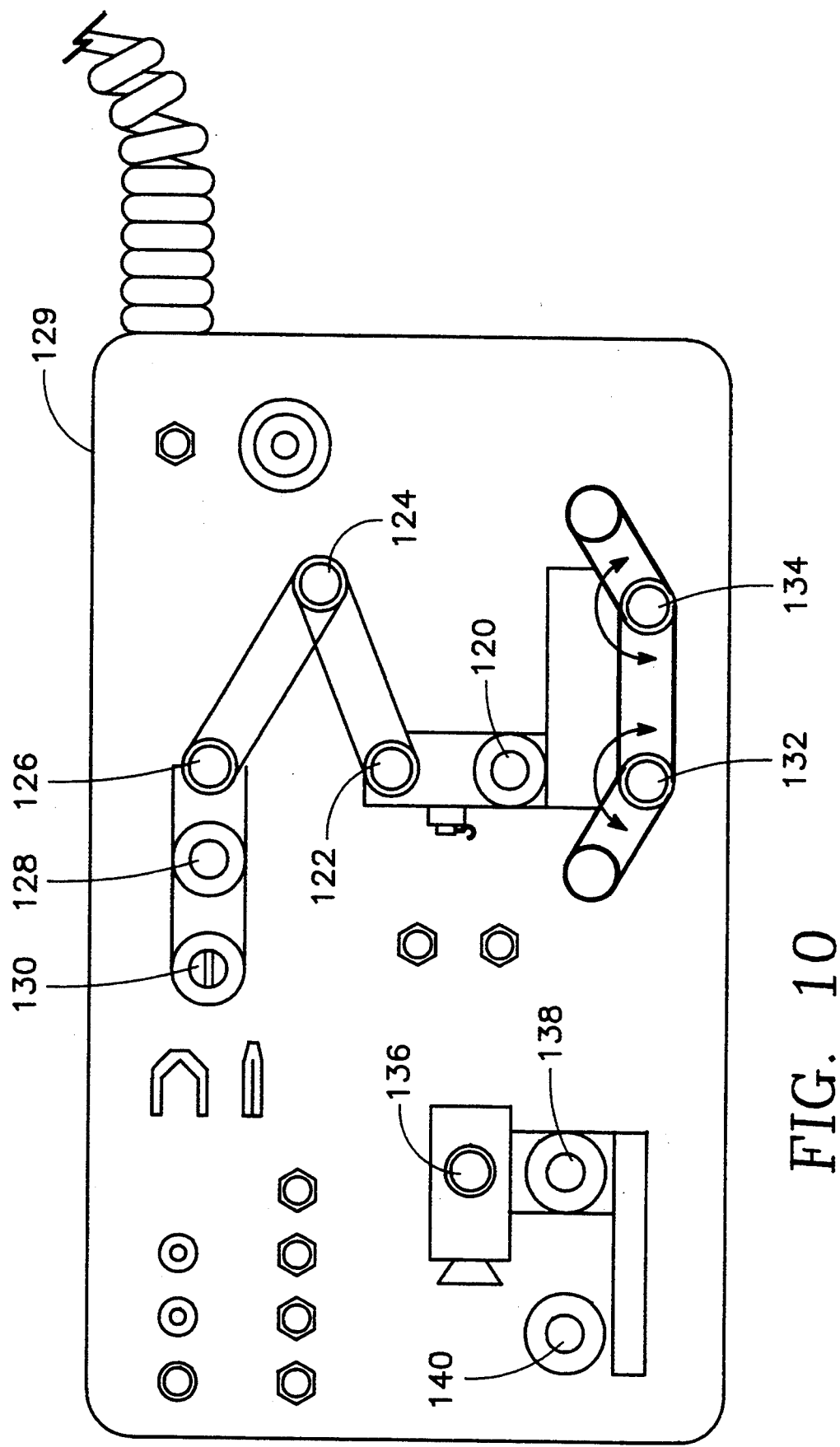
FIG. 10 is a top view of a robot control panel embodying still another aspect of the invention.

Referring to FIG. 10, in order to simplify the operator's task of controlling all of the robot joints to effect each one of the motions described above, the motion of each joint is controlled through conventional servo mechanisms by finger-actuated control devices including spring-returned rotating knobs 122, 124, 126, 132, 134, 136 and single axis joy sticks 120, 128, 130, 138, 140 mounted on images of corresponding joints in a two-dimensional graphical representation of the robot printed on the surface or panel of a control box 129. The finger-actuated control devices 120, 122, 124, 126 and 128 control joints 20, 24, 26, 30 and 34, respectively, and are mounted on images of those respective joints. The single axis joy stick 130 controls the opening and closing of the fingers 92, 94 of the parallel gripper jaw 36. The spring-returned rotating knobs 132, 134 control the articulating front and rear tracks 12 and 14, respectively. The spring returned control knob 136 and the single axis joy stick 138 control the vertical and horizontal rotation of the side camera 76 while the single axis joy stick 140 controls horizontal rotation of the side boom 78.

Figure 11A:
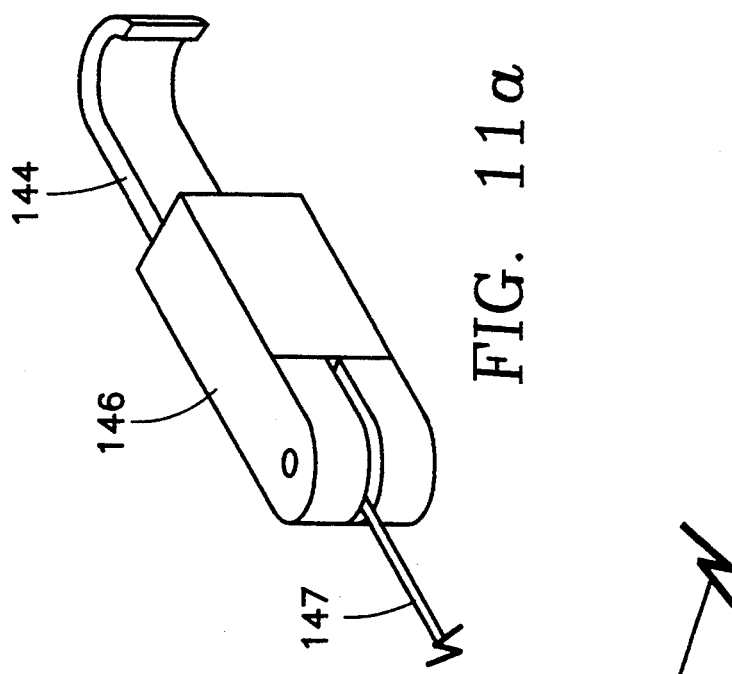
FIG. 11a is a diagram of specially designed hook in accordance with a further aspect of the invention for opening latched doors in the operation illustrated in FIGS. 11b through 11e.

In order to open latched doors (i.e., doors which require depression of a thumb latch while pulling on a door handle), the robot includes a remotely controlled winch mechanism 142 for deploying and retrieving a specially designed hook 144 attached to the end of a fine cable 147 (FIG. 11*a*). As shown in FIG. 11*a*, the specially designed hook 144 is attached at its proximal end to a weight 146, and the curvature of the end of the hook 144 is limited to being about a half circle. To open such a door, the robot arm grasps the hook 144 located in the front of the vehicle and hooks it on a handle 148 of door 150. During this operation, a moderate amount of tension is maintained on the fine cable 147 by a conventional spring loaded mechanism (not shown) within the winch 142. This tension insures that the hook 144 will remain on the door handle 148 once the robot arm lets go of the hook 144, as shown in FIG. 11*b*.

Figure 11C:
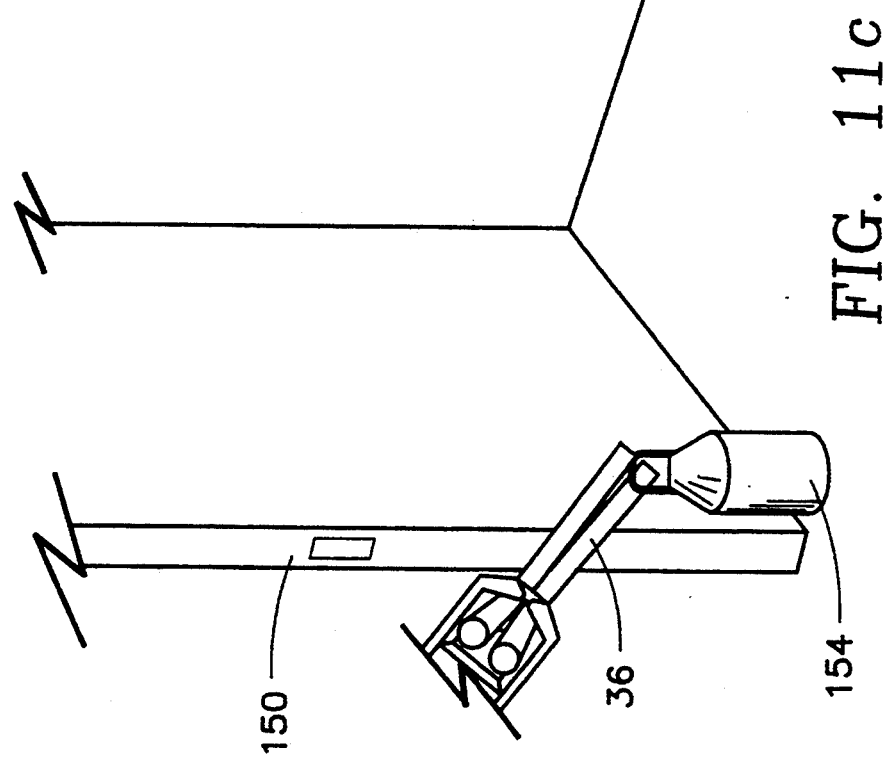
Figure 11B:
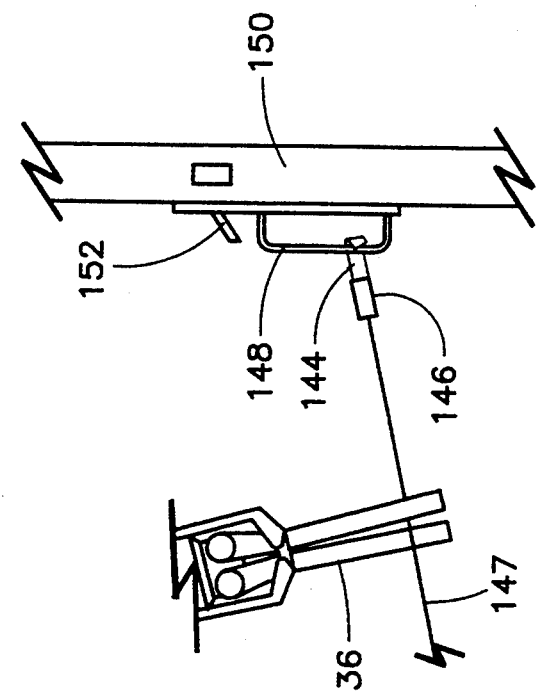
Figure 11D:
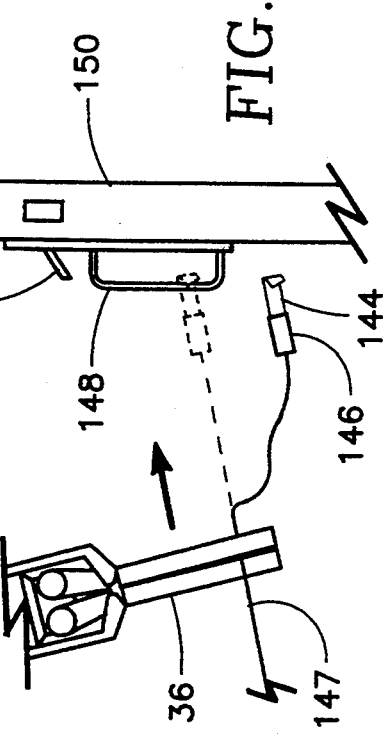
Figure 11E:
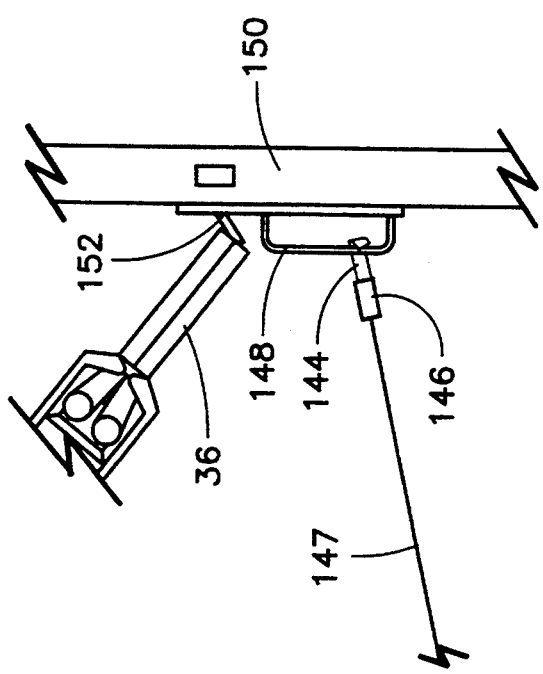

After releasing the hook 144, the robot arm depresses the door latch 152 (FIG. 11*b*). The winch mechanism 142 is then switched to its locked position which prevents the cable 147 from being pulled out any further. Then the robot is driven backwards several inches, causing the cable 147 to pull the door 150 open while the robot arm is simultaneously depressing the door's thumb latch 148. At this point the door 150 is slightly opened, and the robot arm can release the door latch 152 (by moving away from the door 150). Then, either the robot can back up further or the winch 142 can be activated to reel in the cable 147, so as to open the door 150 to a nearly completely open position. At this point the robot arm reaches around to the back of the vehicle and grasps a weighted bag 154 (a dead weight) which is carried by the robot. By placing the weighted bag 154 near the inside bottom of the door 150 (FIG. 11*c*) and by then rotating the robot arm side ways, pushing on the door 150, the door 150 can be opened completely. When the robot arm and weighted bag 154 make contact with the inside of the door 150, the winch 142 is switched from its locked position so that the cable 147 will be passively paid out when the robot arm pushes on the door 150. The robot arm ungrasps the weighted bag 154 which then falls to the ground and secures the door 150 in its fully open position. Referring to FIG. 11*d*, the robot arm is then used to grasp the cable 147 just behind the hook 144 to release the tension on the portion of the cable 147 between the grasp point on the cable 147 and hook 144. This causes the hook 144 to automatically fall off of the door handle 148 (FIG. 11*e*) due to its weight distribution and its shape. Finally, the robot arm can ungrasp the hook 148 which will automatically be retrieved since the winch mechanism 142 is still in its spring loaded mode of operation.

While the invention has been described by specific reference to preferred embodiments thereof, it is understood that variations and modifications thereof may be made without departing from the true spirit and scope of the invention.

What is claimed is:

1. A robot for inserting a key in a keyhole in a doorknob mounted on a door, said robot comprising a platform on which tracks for self-mobility and a first end of a robot arm are attached, and an end effector mounted to a second end of said robot arm, said robot further comprising:

a key;

tool means, grippable by said end effector, for holding said key while pressing said key against said keyhole, wherein the tool means includes, means allowing rotation up to nearly 90 degrees about a vertical axis in relation to said end effector, means for extending forwardly and adjacent the key for engaging plural points on a surface of the door adjacent the doorknob for centering the key with respect to the keyhole, means for permitting bending of said tool means in at least one of two orthogonal axes; and, said tracks comprising articulated means for rotating said robot forward about an end of said tracks relative to a center part of said tracks whereby said key travels in an arc of a radius corresponding to a distance between said tracks and said key, wherein said tool means for holding said key deforms so as to allow said key to travel in at least a nearly straight path through said key hole.

2. The robot of claim 1 wherein said bending means comprises:

a pair of mutually orthogonal deformable leafs connected together, one of said leafs being coupled to said allowing means that is gripped by said end effector and the other of said leafs being coupled to said key.

3. The robot of claim 1 further comprising:

means for permitting manual control of said robot by an operator;

means for displaying an image to said operator;

image detector means for viewing a scene to be displayed on said means for displaying;

a boom means for holding said image detector means so that said image detector means has a perspective view of said key.

4. The robot of claim 3 wherein said boom means comprises means for holding said image detector means at a location offset to one side with respect to said straight path whereby said image detector provides a side view of said straight path.

5. The robot of claim 3 wherein said robot arm comprises a multi-joint robot arm with the first end attached to a rotatable joint rotatable in a horizontal plane, and wherein said boom means is attached to said rotatable joint so as to rotate therewith, whereby to avoid collisions between said image detector means and said robot arm.

6. The robot of claim 1 further including a means for sensing an environment behind a closed door, the means for sensing comprising:

the robot arm comprising a plurality of arm segments connected by joints providing said arm with plural degrees of freedom;

the end effector having an end surface;

at least one nose hole in said end surface of said end effector and at least one interior passage within said end effector coupled to said one nose hole;

an environment sensor on board said robot and coupled to said one interior passage.

7. The robot of claim 6 further comprising an air pump coupled to said interior passage for drawing air through said nose hole.

8. A remotely-controlled mobile robot comprising:

a robot arm having an end effector at a distal end of said robot arm having an end surface;

means for permitting manual control of said robot by an operator;

means for displaying an image to said operator;

image detector means coupled to said end effector for viewing a scene encompassing said end effector to be displayed on said means for displaying; and means coupled to said end effector for radiating a beam of visible light at an acute angle with respect to a line of sight of said image detector means from a location rearward of said end surface and through a location near said end surface, whereby to illuminate a spot on an exterior target surface facing said end surface at a height relative to said end effector in said image proportional to a displacement between said end surface and said target surface, whereby a velocity of said end surface with respect to said target surface is displayed in said image as a velocity of said beam spot relative to said end effector in a vertical direction.

9. The robot of claim 6 further comprising:

a rotatable robot joint coupling said end effector to said robot arm, said robot joint having slip ring means for communicating gases in said interior passage across said joint.

10. The robot of claim 1 wherein said robot arm comprises a plurality of arm segments connected by joints providing said arm with plural degrees of freedom, and further including a control panel for manual control of the robot, comprising:

a panel surface having an image of said robot illustrating relative locations of all said joints;

a plurality of moveable hand controls on said panel surface, each of said hand controls being connected for controlling movement of a corresponding one of said joints, each of said hand controls being mounted proximal an image of a corresponding one of the joints in said image on said panel surface.

11. The control panel of claim 10 wherein said robot further comprises a side boom having a camera mounted thereon for transmitting images of said robot to a remote operator, said side boom comprising plural boom joints including a first boom joint for rotating said side boom about a vertical axis for positioning said camera in a horizontal plane and second and third boom joints for panning and tilting said camera respectively.

12. The robot of claim 1 wherein said robot is further capable of opening latched doors, said robot further comprising:

winch means;

a weighted hook and a cable connecting said weighted hook to said winch means.

13. The robot of claim 12 wherein said weighted hook comprises a hook having a partially arcuate shape such that said hook is engagable with a door handle while being held tautly by said cable, said weighted hook further comprising a weight coupled to said hook having sufficient mass such that said weight pulls said hook from engagement with said door handle upon said cable being released from tautness.

14. A method of opening a latched door with a robot having a weighted hook attached to a winch on said robot via a cable, said robot further comprising a movable arm having an end effector, said method comprising:

grasping and moving said hook with said end effector so as to engage said hook with a door handle of said door;

drawing said cable tightly with said winch so as to strain said hook against said door handle;

releasing said end effector from said hook and depressing a door latch of said door;

drawing said hook in a direction in which said door opens whereby to open said door;

withdrawing said end effector from said latch and grasping a weight with said end effector, moving said end effector so as to block said door with said weight and releasing said weight from said end effector; and grasping said cable with said end effector while releasing said winch so as to release tension in said cable from said weighted hook, whereby said weighted hook falls from engagement with said door handle.

15. The method of claim 14 wherein said withdrawing comprises one of: (a) backing said robot away from said door, and (b) drawing in said cable on said winch.

* * * * *